United States Patent
Fleischman

[11] 3,799,656
[5] Mar. 26, 1974

[54] OPTICAL RELAY SYSTEM
[75] Inventor: Andor A. Fleischman, Northbrook, Ill.
[73] Assignee: Bell & Howell Company, Chicago, Ill.
[22] Filed: June 8, 1972
[21] Appl. No.: 260,961

[52] U.S. Cl.............. 350/222, 350/50, 350/173, 350/215, 350/217, 355/46, 355/66
[51] Int. Cl...... G02b 9/36, G02b 9/62, G02b 17/10
[58] Field of Search............................. 350/217, 222

[56] References Cited
UNITED STATES PATENTS
2,600,207  6/1952  Cook ................................. 350/222
2,649,026  8/1953  Altman .............................. 350/222

Primary Examiner—John K. Corbin
Attorney, Agent, or Firm—Woodling, Krost, Granger & Rust

[57] ABSTRACT

An optical relay system is disclosed for transferring an image from a master photographic film to a plurality of copy photographic films comprising a reduction lens, a beam splitter and a relay lens. The reduction lens is corrected to have reduced curvature of field whereas the relay lens is corrected to accommodate for a plurality of off-axis images. The optical relay system is folded to allow conveyance of the photographic films by a single driving assembly.

9 Claims, 5 Drawing Figures

OPTICAL RELAY SYSTEM

BACKGROUND OF THE INVENTION

The commercial success of the new super 8 mm photographic format has led to a wide use of this format in a variety of applications. A great deal of quality material is contained in other formats, particularly in the 16 mm. photographic format, and it has become necessary to translate this material into the new super 8 mm. format in an economical way.

The prior art has known many types of continuous reduction printers to transfer from one format to another. The continuous printers of the prior art had the difficulty of holding registration of the master photographic film relative to the copy photographic film. Another difficulty experienced when a plurality of simultaneous copies were desired was the difference in optical path length between the master film and each of the copy films. The optical path length between the master and each of the copy films must be identical to eliminate variations between the two simultaneous copies. A fundamental difficulty in the prior art continuous printers was the inadequate optics available to transfer to a plurality of copy films.

Therefore, an object of this invention is to produce an optical relay system wherein the master and copy photographic films can be conveyed by a single drive assembly.

Another object of this invention is to produce an optical relay system having a beam splitter and means to equalize the path length between the master and the plurality of copy films.

Another object of this invention is to produce a reduction lens with a wide flat field of view.

Another object of this invention is to produce a relay lens which is color corrected for off-axis images.

Another object of this invention is to produce a high quality relay system to enable high speed, high quality copies.

SUMMARY OF THE INVENTION

The invention may be incorporated in an optical relay system to transfer light between a first optical surface and a plurality of second optical surfaces, comprising in combination, first focus means, beam splitting means, means transferring a light beam between the first optical surface and said beam splitting means, said beam splitting means able to change a single light beam into a plurality of light beams having substantially parallel optical axes, and means establishing said first focus means to transfer said plurality of light beams between said beam splitting means and the plurality of second optical surfaces, respectively.

Other objects and a fuller understanding of the invention may be had by referring to the following description and claims, taken in conjunction with the accompanying drawing.

DESCRIPTION OF THE PREFERRED EMBODIMENT

Figure 1:
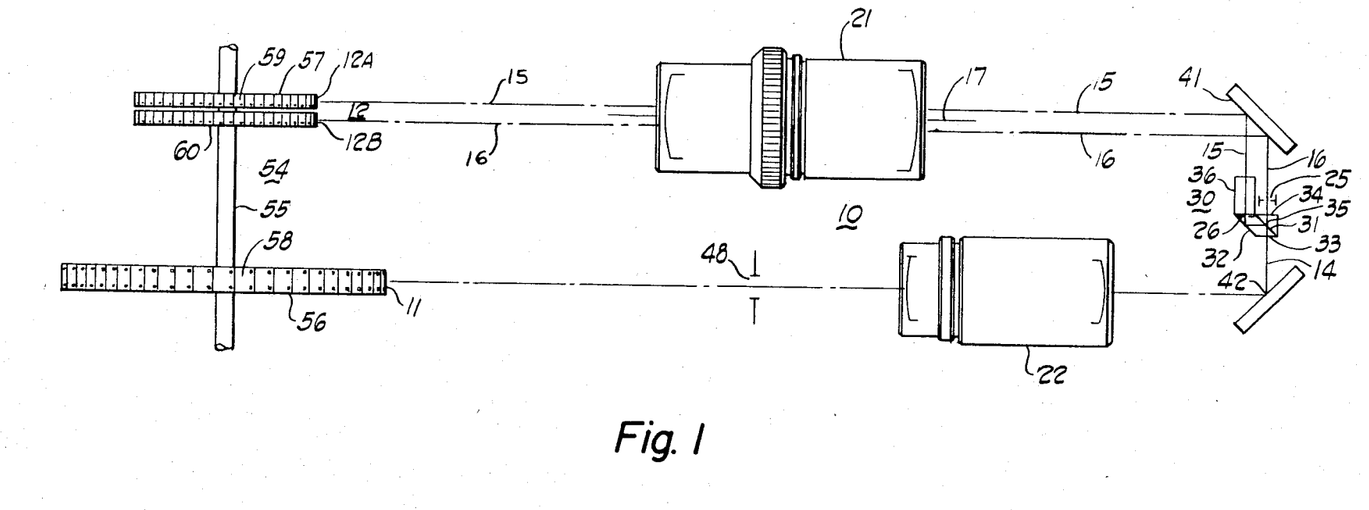
FIG. 1 is the preferred embodiment showing an optical relay system.

FIG. 1 illustrates an optical relay system 10 to transfer light between a first optical surface 11 and a plurality of second optical surfaces 12A and 12B, comprising first focus means 21, beam splitting means 30 and means including second focus means 22 to transfer light between the first optical surface 11 and the beam splitting means 30. The beam splitting means 30 is able to change a single light beam 14 into a plurality of light beams 15 and 16 which are substantially parallel to one another. FIG. 1 also illustrates means including the positioning of the first focus means 21 to transfer the plurality of light beams 15 and 16 between the beam splitting means 30 and the plurality of optical surfaces 12A and 12B, respectively.

The optical surfaces are shown in FIG. 1 to be photographic surfaces or films wherein the first optical surfaces 11 is a first optical format and the second optical surfaces 12 are a second optical format. For example, the first optical format 11 can be 16 mm whereas the second optical format 12 can be super 8 mm. Although the optical surfaces are shown as photographic surfaces, they could be any image recording surface such as an electrostatic surface and the like. The first and second photographic surfaces 11 and 12 are shown positioned on a sprocket assembly 54 which includes a shaft 55 on which sprockets 56 and 57 are located. The sprockets 56 and 57 are shown as being different in diameter to accommodate for the difference in film speed of the 16 mm film 58 and the super 8 mm films 59 and 60. Therefore, the diameters of sprockets 56 and 57 are selected such that a constant rotation of the shaft 55 will convey the 16 mm film 58 and the super 8 mm films 59 and 60 at the proper linear speed. Since all of the photographic films are driven by a single assembly, the problem of synchronization is eliminated. The size of the sprockets 56 and 57 insures proper registration of the optical image surfaces 11, 12A and 12B.

The second lens means 22 transfers the image from the first optical surface 11 to the beam splitter means 30. A stop 48 insures that only the pertinent format of the first optical surface 11 is transferred by the second lens means 22. The image planes created by the second lens means 22 are shown as 25 and 26. The beam splitting means 30 includes a first beam splitting surface 31 and a second beam splitting surface 32. The first beam splitting surface 31 is a partially reflecting surface to allow the beam 14 to pass therethrough to become beam 16 and to allow a portion of beam 14 to be reflected from the first beam splitting surface 31 to the second beam splitting surface 32. The second beam splitting surface 32 is substantially totally reflecting. The first and second beam splitting surfaces 31 and 32 are established substantially parallel to one another and are shown as two faces of an oblique parallelepiped. A triangular prism 34 is established with the hypotenuse 35 thereof adjacent to the first beam splitting surface 31. A rectangular prism 36 is established adjacent to the oblique parallelepiped in order to equalize the path lengths of the beams 15 and 16 between the first optical surface 11 and the second optical surfaces 12A and 12B. Since a portion of the distance from the second lens means 22 to the image plane 26 is directed through the glass oblique parallelpiped, this contracts the equivalent second lens 22 to image plane 26 optical distance. To compensate for this contraction, an additional glass member 36 having an appropriate length is established on the opposite side of the image plane 26 in order to contract the image plane 26 to the first lens 21 distance. The rectangular prism 36 insures proper focus of both beams 15 and 16 on the respective optical surfaces 12A and 12B. The location of the prism 36 is not limited to the location shown but can be placed at various places in either path 15 or 16. The means transferring an image between the first optical surface 11 and the beam splitting means 30 includes a second reflecting surface 42 whereas the means transferring the image from the beam splitting means 30 to the second optical surfaces 12 includes a first reflecting surface 41. The first and second reflecting surfaces 41 and 42 fold the system to allow the master and copy films to be conveyed by the sprocket assembly 54.

The two beams 15 and 16 reflected from the first optical surface 41 impinge upon the first lens means 21 laterally displaced from the optical axis 17 of the first lens means 21. Therefore, the first lens means 21 must be corrected to be able to transfer a plurality of images which are displaced from the optical axis 17 with minimum aberrations. In addition, the second lens means 22 must be corrected over a wide field in order to produce a satisfactory image for the first lens means 21.

Figure 2A:
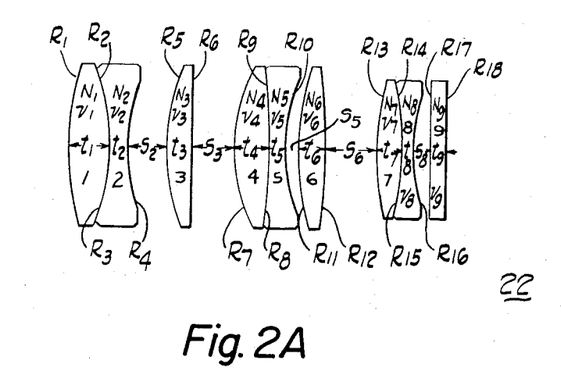
FIG. 2A illustrates a reduction lens suitable for use with the present invention.

FIG. 2A illustrates a nine element reduction lens which is suitable for use as the second lens means 22 comprising a first element 1 being double convex having an axial thickness $t_1$, radius of curvatures $R_1$ and $R_2$, an index of refraction $N_1$ and an Abbe number $\nu_1$. A second element 2 is double concave and in contact with the first element 1 and has an axial thickness $t_2$, radius of curvatures $R_3$ and $R_4$, an index of refraction $N_2$ and an Abbe number $\nu_2$. A third element 3 is a positive meniscus element having an axial thickness $t_3$, radius of curvatures $R_5$ and $R_6$, an index of refraction $N_3$, and an Abbe number $\nu_3$. The third element is spaced from the second element 2 by an axial spacing $S_2$. A fourth element 4 is a double convex element having an axial thickness $t_4$, radius of curvatures $R_7$ and $R_8$, an index of refraction $N_4$, and an Abbe number $\nu_4$. The fourth element 4 is spaced from the third element 3 by an axial spacing $S_3$. A fifth element 5 shown as a double concave element has an axial thickness $t_5$, radius of curvatures $R_9$ and $R_{10}$, an index of refraction $N_5$ and an Abbe number $\nu_5$. The fifth element 5 is shown in contact with the fourth element 4. A sixth element 6 is a double convex element having an axial thickness $t_6$, radius of curvatures $R_{11}$ and $R_{12}$, an index of refraction $N_6$ and an Abbe number $\nu_6$. The sixth element 6 is spaced from the fifth element 5 by an axial spacing $S_5$. A seventh element 7 is shown as a double convex element having an axial thickness $t_7$, radius of curvatures $R_{13}$ and $R_{14}$, an index of refraction $N_7$ and an Abbe number $\nu_7$. The seventh element is shown spaced from the sixth element 6 by an axial spacing $S_6$. An eighth element 8 is a double concave element having an axial thickness $t_8$, radius of curvatures $R_{15}$ and $R_{16}$, an index of refraction $N_8$ and an Abbe number $\nu_8$. The eighth element 8 is shown in contact with the seventh element 7. A ninth element 9 being double convex has an axial thickness $t_9$, radius of curvatures $R_{17}$ and $R_{18}$, index of refraction $N_9$ and an Abbe number $\nu_9$. The ninth element 9 is shown spaced from the eighth element 8 by an axial spacing $S_8$.

The inventor has constructed a lens shown in FIG. 2A in accordance with Table 1 with a lens system focal length (fl.) equal to 3.83 inches. Table 1 represents the optimum values and variation of plus and minus 20 percent for radii, spacing and thickness and plus and minus 2.0 and 0.02 for the Abbe number and index of refraction, respectively, are allowable. A negative radius indicates a concave surface.

TABLE 1

| | |
|---|---|
| $R_1=0.715$ fl. | $S_2=0.089$ fl. |
| $R_2=0.581$ fl. | $S_3=0.101$ fl. |
| $R_3=-0.581$ fl. | $S_5=0.038$ fl. |
| $R_4=-0.443$ fl. | $S_6=0.124$ fl. |
| $R_5=0.482$ fl. | $S_8=0.040$ fl. |
| $R_6=-15.666$ fl. | |
| $R_7=0.377$ fl. | |
| $R_8=1.364$ fl. | $t_1=0.094$ fl. |
| $R_9=-1.364$ fl. | $t_2=0.044$ fl. |
| $R_{10}=-0.322$ fl. | $t_3=0.056$ fl. |
| $R_{11}=0.653$ fl. | $t_4=0.079$ fl. |
| $R_{12}=2.238$ fl. | $t_5=0.034$ fl. |
| $R_{13}=0.874$ fl. | $t_6=0.056$ fl. |
| $R_{14}=0.756$ fl. | $t_7=0.058$ fl. |
| $R_{15}=-0.756$ fl. | $t_8=0.025$ fl. |
| $R_{16}=-0.506$ fl. | $t_9=0.039$ fl. |
| $R_{17}=1.780$ fl. | |
| $R_{18}=13.649$ fl. | |
| | |
| $N_1=1.487$ | $\nu_1=70.4$ |
| $N_2=1.613$ | $\nu_2=44.3$ |
| $N_3=1.668$ | $\nu_3=41.9$ |
| $N_4=1.487$ | $\nu_4=70.4$ |
| $N_5=1.613$ | $\nu_5=44.3$ |
| $N_6=1.668$ | $\nu_6=41.9$ |
| $N_7=1.487$ | $\nu_7=70.4$ |
| $N_8=1.613$ | $\nu_8=44.3$ |
| $N_9=1.668$ | $\nu_9=41.9$ | fl.=3.83 inches

Figure 2B:
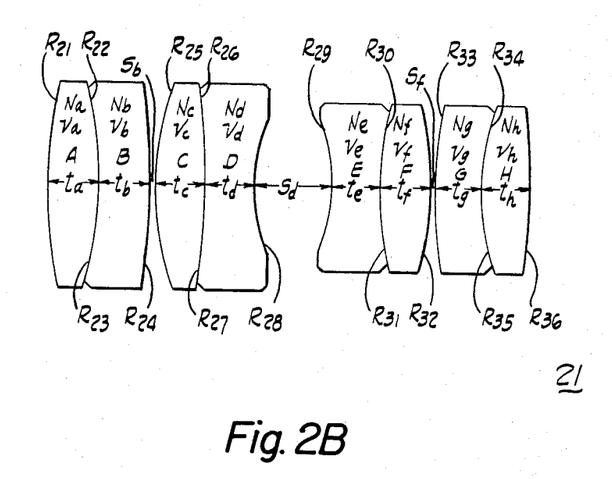
FIG. 2B illustrates a relay lens compatible with the reduction lens shown in FIG. 2A.

FIG. 2B illustrates an eight element lens system 21 which is corrected for relay of images which are off the optical axis of the lens system. The eight element lens system is shown including an A element being double convex having an axial thickness $t_a$, radius of curvatures $R_{21}$ and $R_{22}$, an index of refraction $N_a$ and an Abbe number $\nu_a$. A B element in contact with the A element is a negative meniscus having an axial thickness $t_b$, radius of curvatures $R_{23}$ and $R_{24}$, an index of refraction $N_b$ and an Abbe number $\nu_4$. A C element being double convex is spaced from the B element by an axial spacing $S_b$ and has an axial thickness $t_c$, radius of curvature $R_{25}$ and $R_{26}$, an index of refraction $N_c$ and an Abbe number $\nu_c$. A D element is a double concave element in contact with the C element and has an axial thickness $t_d$, radius of curvatures $R_{27}$ and $R_{28}$, an index of refraction $N_d$ and an Abbe number $\nu_d$. An E element is a double concave element being spaced from the D element by an axial spacing $S_d$ having an axial thickness $t_e$, radius of curvatures $R_{29}$ and $R_{30}$, an index of refraction $N_e$ and an Abbe number $\nu_e$. An F element is a double convex element being on contact with the E element and having an axial thickness $t_f$, radius of curvatures $R_{31}$ and $R_{32}$, an index of refraction $N_f$, and an Abbe number $\nu_f$. A G element is a negative meniscus element spaced from the F element by an axial spacing $S_f$ having an axial thickness $t_g$, radius of curvatures $R_{33}$ and $R_{34}$, an index of refraction $N_g$ and an Abbe number $\nu_g$. An H element is a double convex element in contact with the G element having an axial thickness $t_h$, radius of curvatures $R_{35}$ and $R_{36}$, an index of refraction $N_h$ and an Abbe number $\nu_h$.

The inventor has constructed a number of lenses in accordance with this design and has established a range in which the above lens parameters can be established in order to have proper performance. These are established in part by the fact that some of the materials especially the Schott Glass LGSK-2, N = 1.589 and ν = 60.7, and the Schott Glass FK-51, N = 1.487 and ν = 84.5, exhibit variations in optical properties from one melt to another thus requiring variation in the lens parameters to compensate for variations from one supply of glass to another. tables 2–5 are four examples which establish the range of parameters in which the specifications of the lens must be confined in order to have proper performance. Variations in physical dimensions of twenty per cent are allowable and still produce satisfactory performance. Table 6 represents the allowable range of lens parameters.

| TABLE 2 | TABLE 3 | TABLE 4 |
|---|---|---|
| $R_{21}=0.806$ fl. | $R_{21}=0.716$ fl. | $R_{21}=0.771$ fl. |
| $R_{22}=0.684$ fl. | $R_{22}=1.146$ fl. | $R_{22}=0.875$ fl. |
| $R_{23}=-0.684$ fl. | $R_{23}=-1.146$ fl. | $R_{23}=-0.875$ fl. |
| $R_{24}=1.95$ fl. | $R_{24}=2.622$ fl. | $R_{24}=2.197$ fl. |
| $R_{25}=0.472$ fl. | $R_{25}=0.461$ fl. | $R_{25}=0.438$ fl. |
| $R_{26}=2.104$ fl. | $R_{26}=4.344$ fl. | $R_{26}=4.344$ fl. |
| $R_{27}=-2.104$ fl. | $R_{27}=-1.952$ fl. | $R_{27}=-4.344$ fl. |
| $R_{28}=-0.296$ fl. | $R_{28}=-0.287$ fl. | $R_{28}=-0.277$ fl. |
| $R_{29}=-0.326$ fl. | $R_{29}=-0.315$ fl. | $R_{29}=-0.311$ fl. |
| $R_{30}=-0.947$ fl. | $R_{30}=-0.521$ fl. | $R_{30}=-0.822$ fl. |
| $R_{31}=0.947$ fl. | $R_{31}=0.521$ fl. | $R_{31}=0.822$ fl. |
| $R_{32}=0.553$ fl. | $R_{32}=0.544$ fl. | $R_{32}=0.559$ fl. |
| $R_{33}=1.015$ fl. | $R_{33}=0.933$ fl. | $R_{33}=1.113$ fl. |
| $R_{34}=-0.464$ fl. | $R_{34}=-0.464$ fl. | $R_{34}=-0.396$ fl. |
| $R_{35}=0.464$ fl. | $R_{35}=0.464$ fl. | $R_{35}=0.396$ fl. |
| $R_{36}=0.838$ fl. | $R_{36}=0.838$ fl. | $R_{36}=0.703$ fl. |
| $t_a=0.097$ fl. | $t_a=0.098$ fl. | $t_a=0.103$ fl. |
| $t_b=0.098$ fl. | $t_b=0.093$ fl. | $t_b=0.092$ fl. |
| $t_c=0.098$ fl. | $t_c=0.097$ fl. | $t_c=0.094$ fl. |
| $t_d=0.097$ fl. | $t_d=0.093$ fl. | $t_d=0.092$ fl. |
| $t_e=0.097$ fl. | $t_e=0.092$ fl. | $t_e=0.092$ fl. |
| $t_f=0.098$ fl. | $t_f=0.098$ fl. | $t_f=0.095$ fl. |
| $t_g=0.098$ fl. | $t_g=0.092$ fl. | $t_g=0.092$ fl. |
| $t_h=0.098$ fl. | $t_h=0.098$ fl. | $t_h=0.098$ fl. |
| $N_a=1.589$, $\nu_a=60.6$ | $N_a=1.589$, $\nu_a=60.6$ | $N_a=1.589$, $\nu_a=60.7$ |
| $N_b=1.613$, $\nu_b=44.3$ | $N_b=1.613$, $\nu_b=44.3$ | $N_b=1.613$, $\nu_b=44.3$ |
| $N_c=1.589$, $\nu_c=60.6$ | $N_c=1.589$, $\nu_c=60.6$ | $N_c=1.589$, $\nu_c=60.7$ |
| $N_d=1.613$, $\nu_d=44.3$ | $N_d=1.613$, $\nu_d=44.3$ | $N_d=1.613$, $\nu_d=44.3$ |
| $N_e=1.613$, $\nu_e=44.3$ | $N_e=1.613$, $\nu_e=44.3$ | $N_e=1.613$, $\nu_e=44.3$ |
| $N_f=1.589$, $\nu_f=60.6$ | $N_f=1.589$, $\nu_f=60.6$ | $N_f=1.589$, $\nu_f=60.7$ |
| $N_g=1.613$, $\nu_g=44.3$ | $N_g=1.613$, $\nu_g=44.3$ | $N_g=1.613$, $\nu_g=44.3$ |
| $N_h=1.589$, $\nu_h=60.6$ | $N_h=1.589$, $\nu_h=60.6$ | $N_h=1.589$, $\nu_h=60.7$ |
| $S_b=0.002$ fl. | $S_b=0.018$ fl. | $S_b=0.001$ fl. |
| $S_d=0.151$ fl. | $S_d=0.139$ fl. | $S_d=0.144$ fl. |
| $S_f=0.002$ fl. | $S_f=0.001$ fl. | $S_f=0.001$ fl. |

NOTE.—fl. = 4.606 inches.

| TABLE 5 | TABLE 6 |
|---|---|
| $R_{21}=0.680$ fl. | $0.54$ fl. $\leq R_{21} \leq 0.96$ fl. |
| $R_{22}=1.134$ fl. | $0.54$ fl. $\leq R_{22} \leq 1.38$ fl. |
| $R_{23}=-1.134$ fl. | $-1.38$ fl. $\leq R_{23} \leq -0.54$ fl. |
| $R_{24}=3.108$ fl. | $1.55$ fl. $\leq R_{24} \leq 3.73$ fl. |
| $R_{25}=0.472$ fl. | $0.35$ fl. $\leq R_{25} \leq 0.53$ fl. |
| $R_{26}=2.553$ fl. | $1.55$ fl. $\leq R_{26} \leq 5.21$ fl. |
| $R_{27}=-2.553$ fl. | $-5.21$ fl. $\leq R_{27} \leq -1.55$ fl. |
| $R_{28}=-0.284$ fl. | $-0.36$ fl. $\leq R_{28} \leq -0.27$ fl. |
| $R_{29}=-0.304$ fl. | $-0.39$ fl. $\leq R_{29} \leq -0.24$ fl. |
| $R_{30}=-0.514$ fl. | $-1.15$ fl. $\leq R_{30} \leq -0.40$ fl. |
| $R_{31}=0.514$ fl. | $0.40$ fl. $\leq R_{31} \leq 1.15$ fl. |
| $R_{32}=0.521$ fl. | $0.42$ fl. $\leq R_{32} \leq 0.66$ fl. |
| $R_{33}=0.898$ fl. | $0.72$ fl. $\leq R_{33} \leq 1.33$ fl. |
| $R_{34}=-0.464$ fl. | $-0.57$ fl. $\leq R_{34} \leq -0.31$ fl. |
| $R_{35}=0.464$ fl. | $0.31$ fl. $\leq R_{35} \leq 0.57$ fl. |
| $R_{36}=0.838$ fl. | $0.56$ fl. $\leq R_{36} \leq 1.01$ fl. |
| $t_a=0.098$ fl. | $0.08$ fl. $\leq t_a \leq 0.12$ fl. |
| $t_b=0.092$ fl. | $0.08$ fl. $\leq t_b \leq 0.12$ fl. |
| $t_c=0.080$ fl. | $0.08$ fl. $\leq t_c \leq 0.12$ fl. |
| $t_d=0.093$ fl. | $0.08$ fl. $\leq t_d \leq 0.12$ fl. |
| $t_e=0.093$ fl. | $0.08$ fl. $\leq t_e \leq 0.12$ fl. |
| $t_f=0.098$ fl. | $0.08$ fl. $\leq t_f \leq 0.12$ fl. |
| $t_g=0.092$ fl. | $0.08$ fl. $\leq t_g \leq 0.12$ fl. |
| $t_h=0.098$ fl. | $0.08$ fl. $\leq t_h \leq 0.12$ fl. |
| $N_a=1.589$, $\nu_a=60.6$ | $1.57 \leq N_a \leq 1.61$, $58 \leq \nu_a \leq 63$ |
| $N_b=1.613$, $\nu_b=44.3$ | $1.59 \leq N_b \leq 1.63$, $42 \leq \nu_b \leq 46$ |
| $N_c=1.589$, $\nu_c=60.6$ | $1.57 \leq N_c \leq 1.61$, $58 \leq \nu_c \leq 63$ |
| $N_d=1.613$, $\nu_d=44.3$ | $1.59 \leq N_d \leq 1.63$, $42 \leq \nu_d \leq 46$ |
| $N_e=1.613$, $\nu_e=44.3$ | $1.59 \leq N_e \leq 1.63$, $42 \leq \nu_e \leq 46$ |
| $N_f=1.589$, $\nu_f=60.6$ | $1.57 \leq N_f \leq 1.61$, $58 \leq \nu_f \leq 63$ |
| $N_g=1.613$, $\nu_g=44.3$ | $1.59 \leq N_g \leq 1.63$, $42 \leq \nu_g \leq 46$ |
| $N_h=1.589$, $\nu_h=60.6$ | $1.57 \leq N_h \leq 1.61$, $58 \leq \nu_h \leq 63$ |
| $S_b=0.051$ fl. | $0.0008$ fl. $\leq S_b \leq 0.06$ fl. |
| $S_d=0.101$ fl. | $0.08$ fl. $\leq S_d \leq 0.18$ fl. |
| $S_f=0.001$ fl. | $0.0008$ fl. $\leq S_f \leq 0.0025$ fl. |

NOTE.—fl. = 4.606 inches.

Figure 3A:
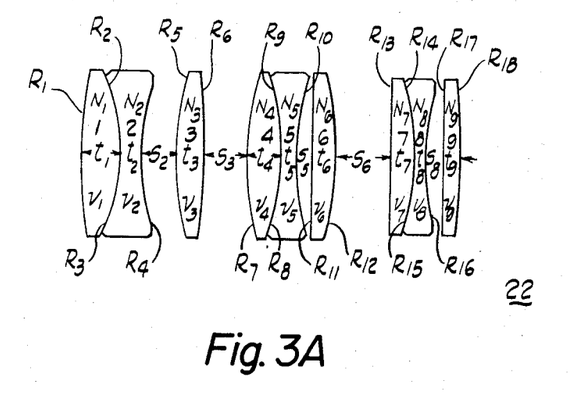
FIG. 3A illustrates a variation of the reduction lens shown in FIG. 2A.

FIG. 3A illustrates a nine element lens system suitable for use as the second lens 22 in FIG. 1 and is a variation of the reduction lens shown in FIG. 2A. The principle differences between the lens systems in FIG. 2A and FIG. 3A are the curvature of R6 and the different indices of refraction. The specifications of the lens shown in FIG. 3A are given in Table 7 and variation of plus and minus 20 percent in physical dimensions and plus and minus 2.0 and 0.02 in the Abbe number and index of refraction, respectively, are allowable.

TABLE 7

| | |
|---|---|
| $R_1=0.973$ fl. | $S_2=0.080$ fl. |
| $R_2=0.384$ fl. | $S_3=0.096$ fl. |
| $R_3=-0.384$ fl. | $S_5=0.038$ fl. |
| $R_4=-0.486$ fl. | $S_6=0.123$ fl. |
| $R_5=0.604$ fl. | $S_8=0.040$ fl. |
| $R_6=1.387$ fl. | |
| $R_7=0.614$ fl. | |
| $R_8=0.630$ fl. | $t_1=0.094$ fl. |
| $R_9=-0.630$ fl. | $t_2=0.044$ fl. |
| $R_{10}=-0.528$ fl. | $t_3=0.065$ fl. |
| $R_{11}=3.237$ fl. | $t_4=0.084$ fl. |
| $R_{12}=0.664$ fl. | $t_5=0.034$ fl. |
| $R_{13}=2.228$ fl. | $t_6=0.056$ fl. |
| $R_{14}=0.519$ fl. | $t_7=0.058$ fl. |
| $R_{15}=0.519$ fl. | $t_8=0.025$ fl. |
| $R_{16}=-0.656$ fl. | $t_9=0.039$ fl. |
| $R_{17}=4.460$ fl. | |
| $R_{18}=1.591$ fl. | |
| $N_1=1.487$ | $\nu_1=70.4$ |
| $N_2=1.613$ | $\nu_2=44.3$ |
| $N_3=1.668$ | $\nu_3=41.9$ |
| $N_4=1.487$ | $\nu_4=70.4$ |
| $N_5=1.613$ | $\nu_5=44.3$ |
| $N_6=1.668$ | $\nu_6=41.9$ |
| $N_7=1.487$ | $\nu_7=70.4$ |
| $N_8=1.613$ | $\nu_8=44.3$ |
| $N_9=1.668$ | $\nu_9=41.9$ | fl. = 3.83 inches

Figure 3B:
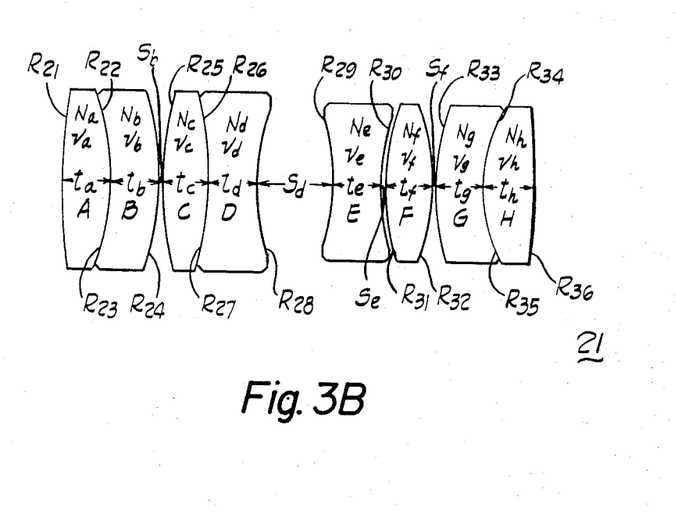
FIG. 3B illustrates a relay lens compatible for use with the reduction lens shown in FIG. 3A.

FIG. 3B illustrates the relay lens suitable for use as a first lens 21 and which is compatible for use with the lens shown in FIG. 3A. The eight element lens shown in FIG. 3B is a variation of the lens shown in FIG. 2B with the principle distinctions being the choice of materials of the optical elements and the spacing $S_e$ between the e and f lens elements. Table 8 gives the optimum values of lens parameters with variations of plus and minus 20 percent in physical dimensions and plus and minus 2.0 and 0.02 in the Abbe number and index of refraction are allowable.

TABLE 8

| | |
|---|---|
| $R_{21}=0.926$ fl. | $t_a=0.099$ fl. |
| $R_{22}=0.450$ fl. | $t_b=0.094$ fl. |
| $R_{23}=-0.450$ fl. | $t_c=0.093$ fl. |
| $R_{24}=0.697$ fl. | $t_d=0.088$ fl. |
| $R_{25}=0.523$ fl. | $t_e=0.093$ fl. |
| $R_{26}=0.644$ fl. | $t_f=0.094$ fl. |
| $R_{27}=-0.644$ fl. | $t_g=0.090$ fl. |
| $R_{28}=-0.347$ fl. | $t_h=0.097$ fl. |
| $R_{29}=-0.272$ fl. | |
| $R_{30}=-0.522$ fl. | |
| $R_{31}=0.520$ fl. | $S_b=0.001$ fl. |
| $R_{32}=0.394$ fl. | $S_d=0.152$ fl. |

TABLE 8.—Continued

| | |
|---|---|
| $R_{33}=0.750$ fl. | $S_e= 0.010$ fl. |
| $R_{34}=-0.292$ fl. | $S_f=0.001$ fl. |
| $R_{35}=0.292$ fl. | |
| $R_{36}=1.936$ fl. | |
| $N_a=1.487$ | $\nu_1=84.5$ |
| $N_b=1.517$ | $\nu_b=64.2$ |
| $N_c=1.487$ | $\nu_c=84.5$ |
| $N_d=1.517$ | $\nu_d=64.2$ |
| $N_e=1.517$ | $\nu_e=64.2$ |
| $N_f=1.487$ | $\nu_f=84.5$ |
| $N_g=1.517$ | $\nu_g=64.2$ |
| $N_h=1.487$ | $\nu_h=84.5$ | fl.=4.606

The optical relay system in FIG. 1 can incorporate a tandem lens system comprising either the lenses shown in FIG. 2A and 2B or the lenses shown in FIGS. 3A and 3B. Although primarily designed to function in tandem, any of the lenses shown in FIGS. 2 and 3 can find useful application as individual components. The lenses shown in FIGS. 2A and 3A have the characteristic of a wide flat field with extremely accurate color correction. The lens system shown in FIGS. 2B and 2C have the characteristic of being able to transfer a plurality of images having optical axes off the optical axis of the lens and still maintain excellent color transfer.

The optical relay system as disclosed in its preferred embodiment illustrates a system to transfer images on a photographic surface from a 16 mm format to a super 8 mm format. However, with the proper selection of focal lengths of the first and second lens means 21 and 22, the optical relay system can be used to transfer between any format including a 1:1 copying system.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An eight element lens system, comprising in combination:

an A element being double convex having radius of curvatures of $R_{21}$ and $R_{22}$ and an index of refraction $N_a$, a B element being a negative meniscus having radius of curvatures of $R_{23}$ and $R_{24}$ and an index of refraction $N_b$, a C element being double convex having radius of curvatures of $R_{25}$ and $R_{26}$ and an index of refraction $N_c$, a D element being double concave having radius of curvatures of $R_{27}$ and $R_{28}$ and an index of refraction $N_3$, an E element being double concave having radius of curvatures of $R_{29}$ and $R_{30}$ and an index of refraction $N_e$, an F element being double convex having radius of curvatures of $R_{31}$ and $R_{32}$ and an index of refraction $N_f$, a G element being a negative meniscus having radius of curvatures of $R_{33}$ and $R_{34}$ and an index of refraction $N_g$, an H element being double convex having radius of curvatures of $R_{35}$ and $R_{36}$ and an index of refraction $N_h$, wherein said radii and said indices of refraction are substantially:

| | | |
|---|---|---|
| $[0.54$ fl.$\leq R_{21}\leq 0.96$ fl. | $-0.39$ fl.$\leq R_{29}\leq -0.24$ fl.$]$ | $1.57\leq N_a\leq 1.61$ |
| $[0.54$ fl.$\leq R_{22}\leq 1.38$ fl. | $-1.15$ fl.$\leq R_{30}\leq -0.40$ fl.$]$ | $1.59\leq N_b\leq 1.63$ |
| $[-1.38$ fl.$\leq R_{23}\leq -0.54$ fl. | $0.40$ fl.$\leq R_{31}\leq 1.15$ fl.$]$ | $1.57\leq N_c\leq 1.61$ |
| $[1.55$ fl.$\leq R_{24}\leq 3.73$ fl. | $0.42$ fl.$\leq R_{32}\leq 0.66$ fl.$]$ | $1.59\leq N_d\leq 1.63$ |
| $[0.35$ fl.$\leq R_{25}\leq 0.53$ fl. | $0.72$ fl.$\leq R_{33}\leq 1.33$ fl.$]$ | $1.59\leq N_e\leq 1.63$ |
| $[1.55$ fl.$\leq R_{26}\leq 5.21$ fl. | $-0.57$ fl.$\leq R_{34}\leq -0.31$ fl.$]$ | $1.57\leq N_f\leq 1.61$ |
| $[5.21$ fl.$\leq R_{27}\leq -1.55$ fl. | $0.31$ fl.$\leq R_{35}\leq 0.57$ fl.$]$ | $1.59\leq N_g\leq 1.63$ |
| $[0.36$ fl.$\leq R_{28}\leq -0.27$ fl. | $0.56$ fl.$\leq R_{36}\leq 1.01$ fl.$]$ | $1.57\leq N_h\leq 1.61$ |

NOTE.—Where fl. is the focal length of the lens system.

| | |
|---|---|
| $0.68$ fl.$\leq R_{21}\leq 0.81$ fl. | $-0.30$ fl.$\leq R_{29}\leq -0.33$ fl. |
| $0.68$ fl.$\leq R_{22}\leq 1.15$ fl. | $-.95$ fl.$\leq R_{30}\leq -0.51$ fl. |
| $-1.15$ fl.$\leq R_{23}\leq -0.68$ fl. | $0.51$ fl.$\leq R_{31}\leq 0.95$ fl. |
| $1.95$ fl.$\leq R_{24}\leq 3.11$ fl. | $0.52$ fl.$\leq R_{32}\leq 0.56$ fl. |
| $0.44$ fl.$\leq R_{25}\leq 0.47$ fl. | $0.90$ fl.$\leq R_{33}\leq 1.11$ fl. |
| $1.95$ fl.$\leq R_{26}\leq 4.34$ fl. | $-0.46$ fl.$\leq R_{34}\leq -0.39$ fl. |
| $-4.34$ fl.$\leq R_{27}\leq -1.95$ fl. | $0.39$ fl.$\leq R_{35}\leq 0.46$ fl. |
| $-0.30$ fl.$\leq R_{28}\leq -0.28$ fl. | $0.70$ fl.$\leq R_{36}\leq 0.84$ fl. |

NOTE.—[Where fl. is the focal length of the lens system.]

2. An eight element lens system as set forth in claim 1 wherein said A to H lens elements have Abbe numbers $\nu_1$ to $\nu_h$, respectively, wherein:

$58 \leq \nu_a \leq 63$ $43 \leq \nu_b \leq 46$ $58 \leq \nu_c \leq 63$ $42 \leq \nu_d \leq 46$ $42 \leq \nu_e \leq 46$ $58 \leq \nu_f \leq 63$ $42 \leq \nu_g \leq 46$ $58 \leq \nu_h \leq 63$ 3. An eight element lens system as set forth in claim 2 wherein:

said B element is in contact with said A element, said C element is spaced from said B element by an axial spacing $S_b$, said D element is in contact with said C element, said E element is spaced from said D element by an axial spacing $S_d$, said F element is in contact with said E element, said G element is spaced from said F element by an axial spacing $S_f$, and said H element is in contact with said G element wherein:

$0.0008$ fl. $\leq S_b \leq 0.06$ fl.

$0.08$ fl. $\leq S_d \leq 0.18$ fl.

$0.0008$ fl. $\leq S_f \leq 0.0025$ fl.

4. An eight element lens system as set forth in claim 3, wherein said A to H lens elements have axial thickness $t_a$ to $t_h$, respectively, wherein:

$0.08$ fl. $\leq t_a, t_b, t_c, t_d, t_e, t_f, t_g, t_h \leq 0.12$ fl.

5. An eight element lens system, comprising in combination:

an A element being double convex having an axial thickness $t_a$, radius of curvatures of $R_{21}$ and $R_{22}$, an index of refraction $N_a$ and an Abbe number $\nu_a$;

a B element being a negative meniscus having an axial thickness $t_b$, radius of curvatures of $R_{23}$ and $R_{24}$, said B element being in contact with said A element, an index of refraction $N_b$, and an Abbe number $\nu_b$;

a C element being double convex having an axial thickness of $t_c$, radius of curvatures of $R_{25}$ and $R_{26}$, said C element being spaced from said B element by an axial spacing $S_b$, an index of refraction $N_c$, and an Abbe number $\nu_c$;

a D element being double concave having an axial thickness of $t_d$, radius of curvatures of $R_{27}$ and $R_{28}$, said D element being in contact with said C element, an index of refraction $N_d$ and an Abbe number $\nu_d$;

an E element being double concave having an axial thickness $t_e$, radius of curvatures of $R_{29}$ and $R_{30}$, said E element being spaced from said D element by an axial spacing $S_d$, an index of refraction $N_e$ and an Abbe number $\nu_e$;

an F element being double convex having an axial thickness $t_f$, radius of curvatures of $R_{31}$ and $R_{32}$, said F element being in contact with said E element, an index of refraction $N_f$ and an Abbe number $\nu_f$;

a G element being a negative meniscus having an axial thickness $t_g$, radius of curvatures of $R_{33}$ and $R_{34}$, said G element being spaced from said F element by an axial spacing $S_f$, an index of refraction $N_g$ and an Abbe number $\nu_g$;

an H element being double convex having an axial thickness of $S_h$, radius of curvatures $R_{35}$ and $R_{36}$, said H element being in contact with said G element, an index of refraction $N_h$ and an Abbe number $\nu_h$;

wherein said thicknesses, spacings, radii, indices of refraction, and Abbe numbers are substantially:

| | |
|---|---|
| $R_{21}$=0.81 fl. | $t_a$=0.1 fl. |
| $R_{22}$=0.68 fl. | $t_b$=0.1 fl. |
| $R_{23}$=−0.68 fl. | $t_c$=0.1 fl. |
| $R_{24}$=2.0 fl. | $t_d$=0.1 fl. |
| $R_{25}$=0.47 fl. | $t_e$=0.1 fl. |
| $R_{26}$=2.10 fl. | $t_f$=0.1 fl. |
| $R_{27}$=−2.10 fl. | $t_g$=0.1 fl. |
| $R_{28}$=−0.3 fl. | $t_h$=0.1 fl. |
| $R_{29}$=0.33 fl. | |
| $R_{30}$=0.95 fl. | |
| $R_{31}$=0.95 fl. | $S_b$=0.002 fl. |
| $R_{32}$=0.55 fl. | $S_d$=0.15 fl. |
| $R_{33}$=1.02 fl. | $S_f$=0.002 fl. |
| $R_{34}$=−0.46 fl. | |
| $R_{35}$=0.46 fl. | |
| $R_{36}$=0.84 fl. | |
| $N_a$=1.59 | $\nu_a$=60 |
| $N_b$=1.61 | $\nu_b$=44 |
| $N_c$=1.59 | $\nu_c$=60 |
| $N_d$=1.61 | $\nu_d$=44 |
| $N_e$=1.61 | $\nu_e$=44 |
| $N_f$=1.59 | $\nu_f$=60 |
| $N_g$=1.61 | $\nu_g$=44 |
| $N_h$=1.59 | $\nu_h$=60 | where fl. is the focal length of the lens system.

6. An eight element lens system, comprising in combination:

an A element being double convex having an axial thickness $t_a$, radius of curvatures of $R_{21}$ and $R_{22}$, an index of refraction $N_a$ and an Abbe number $\nu_a$;

a B element being a negative meniscus having an axial thickness $t_b$, radius of curvatures of $R_{23}$ and $R_{24}$, said B element being in contact with said A element, an index of refraction $N_b$, and an Abbe number $\nu_b$;

a C element being double convex having an axial thickness of $t_c$, radius of curvatures of $R_{25}$ and $R_{26}$, said C element being spaced from said B element by an axial spacing $S_b$, an index of refraction $N_c$, and an Abbe number $\nu_c$;

a D element being double concave having an axial thickness of $t_d$, radius of curvatures of $R_{27}$ and $R_{28}$, said D element being in contact with said C element, an index of refraction $N_d$ and an Abbe number $\nu_d$;

an E element being double concave having an axial thickness $t_e$, radius of curvatures of $R_{29}$ and $R_{30}$, said E element being spaced from said D element by an axial spacing $S_d$, an index of refraction $N_e$ and an Abbe number $\nu_e$;

an F element being double convex having an axial thickness $t_f$, radius of curvatures of $R_{31}$ and $R_{32}$, said F element being in contact with said E element, an index of refraction $N_f$ and an Abbe number $\nu_f$;

a G element being a negative meniscus having an axial thickness $t_g$, radius of curvatures of $R_{33}$ and $R_{34}$, said G element being spaced from said F element by an axial spacing $S_f$, an index of refraction $N_g$ and an Abbe number $\nu_g$;

an H element being double convex having an axial thickness of $S_h$, radius of curvatures $R_{35}$ and $R_{36}$, said H element being in contact with said G element, an index of refraction $N_h$ and an Abbe number $\nu_h$;

wherein said thicknesses, spacings, radii, indicies of refraction, and Abbe numbers are substantially:

| | |
|---|---|
| $R_{21}$=0.72 fl. | $t_a$=0.1 fl. |
| $R_{22}$=1.15 fl. | $t_b$=0.09 fl. |
| $R_{23}$=−1.15 fl. | $t_c$=0.1 fl. |
| $R_{24}$=2.62 fl. | $t_d$=0.09 fl. |
| $R_{25}$=0.46 fl. | $t_e$=0.09 fl. |
| $R_{26}$=2.0 fl. | $t_f$=0.1 fl. |
| $R_{27}$=−2.0 fl. | $t_g$=0.09 fl. |
| $R_{28}$=−0.29 fl. | $t_h$=0.1 fl. |
| $R_{29}$=−0.32 fl. | |
| $R_{30}$=−0.52 fl. | |
| $R_{31}$=0.52 fl. | $S_b$=0.02 fl. |
| $R_{32}$=0.54 fl. | $S_d$=0.14 fl. |
| $R_{33}$=0.93 fl. | $S_f$=0.001 fl. |
| $R_{34}$=−0.46 fl. | |
| $R_{35}$=0.46 fl. | |
| $R_{36}$=0.84 fl. | |
| $N_a$=1.59 | $\nu_a$=60 |
| $N_b$=1.61 | $\nu_b$=44 |
| $N_c$=1.59 | $\nu_c$=60 |
| $N_d$=1.61 | $\nu_d$=44 |
| $N_e$=1.61 | $\nu_e$=44 |
| $N_f$=1.59 | $\nu_f$=60 |
| $N_g$=1.61 | $\nu_g$=44 |
| $N_h$=1.59 | $\nu_h$=60 | where fl. is the focal length of the lens system.

7. An eight element lens system, comprising in combination:

an A element being double convex having an axial thickness $t_a$, radius of curvatures of $R_{21}$ and $R_{22}$, an index of refraction $N_a$ and an Abbe number $\nu_a$;

a B element being a negative meniscus having an axial thickness $t_b$, radius of curvatures of $R_{23}$ and $R_{24}$, said B element being in contact with said A element, an index of refraction $N_b$, and an Abbe number $\nu_b$;

a C element being double convex having an axial thickness of $t_c$, radius of curvatures of $R_{25}$ and $R_{26}$, said C element being spaced from said B element by an axial spacing $S_b$, an index of refraction $N_c$, and an Abbe number $\nu_c$;

a D element being double concave having an axial thickness of $t_d$, radius of curvatures of $R_{27}$ and $R_{28}$, said D element being in contact with said C element, an index of refraction $N_d$ and an Abbe number $\nu_d$;

an E element being double concave having an axial thickness $t_e$, radius of curvatures of $R_{29}$ and $R_{30}$, said E element being spaced from said D element by an axial spacing $S_d$, an index of refraction $N_e$ and an Abbe number $\nu_e$;

an F element being double convex having an axial thickness $t_f$, radius of curvatures of $R_{31}$ and $R_{32}$, said F element being in contact with said E element, an index of refraction $N_f$ and an Abbe number $\nu_f$;

a G element being a negative meniscus having an axial thickness $t_g$, radius of curvatures of $R_{33}$ and $R_{34}$, said G element being spaced from said F element by an axial spacing $S_f$, an index of refraction $N_g$ and an Abbe number $\nu_g$;

an H element being double convex having an axial thickness of $S_h$, radius of curvatures $R_{35}$ and $R_{36}$, said H element being in contact with said G element, an index of refraction $N_h$ and an Abbe number $\nu_h$;

wherein said thicknesses, spacings, radii, indicies of refraction and Abbe numbers are substantially:

| | |
|---|---|
| $R_{21}=0.77$ fl. | $t_a=0.1$ fl. |
| $R_{22}=0.88$ fl. | $t_b=0.09$ fl. |
| $R_{23}=-0.88$ fl. | $t_c=0.09$ fl. |
| $R_{24}=2.20$ fl. | $t_d=0.09$ fl. |
| $R_{25}=0.44$ fl. | $t_e=0.09$ fl. |
| $R_{26}=4.34$ fl. | $t_f=0.1$ fl. |
| $R_{27}=-4.34$ fl. | $t_g=0.09$ fl. |
| $R_{28}=-0.28$ fl. | $t_h=0.1$ fl. |
| $R_{29}=-0.31$ fl. | |
| $R_{30}=-0.82$ fl. | |
| $R_{31}=0.82$ fl. | $S_b=0.001$ fl. |
| $R_{32}=0.56$ fl. | $S_d=0.14$ fl. |
| $R_{33}=1.11$ fl. | $S_f=0.001$ fl. |
| $R_{34}=-0.40$ fl. | |
| $R_{35}=0.40$ fl. | |
| $R_{36}=0.70$ fl. | |
| | |
| $N_a=1.59$ | $\nu_a=60$ |
| $N_b=1.61$ | $\nu_b=44$ |
| $N_c=1.59$ | $\nu_c=60$ |
| $N_d=1.61$ | $\nu_d=44$ |
| $N_e=1.61$ | $\nu_e=44$ |
| $N_f=1.59$ | $\nu_f=60$ |
| $N_g=1.61$ | $\nu_g=44$ |
| $N_h=1.59$ | $\nu_h=60$ | where fl. is the focal length of the lens system.

8. An eight element lens system, comprising in combination:

an A element being double convex having an axial thickness $t_a$, radius of curvatures of $R_{21}$ and $R_{22}$, an index of refraction $N_a$ and an Abbe number $\nu_a$;

a B element being a negative meniscus having an axial thickness $t_b$, radius of curvatures of $R_{23}$ and $R_{24}$, said B element being in contact with said A element, an index of refraction $N_b$, and an Abbe number $\nu_b$;

a C element being double convex having an axial thickness of $t_c$, radius of curvatures of $R_{25}$ and $R_{26}$, said C element being spaced from said B element by an axial spacing $S_b$, an index of refraction $N_c$, and an Abbe number $\nu_c$;

a D element being double concave having an axial thickness of $t_d$, radius of curvatures of $R_{27}$ and $R_{28}$, said D element being in contact with said C element, an index of refraction $N_d$ and an Abbe number $\nu_d$;

an E element being double concave having an axial thickness $t_e$, radius of curvatures of $R_{29}$ and $R_{30}$, said E element being spaced from said D element by an axial spacing $S_d$, an index of refraction $N_e$ and an Abbe number $\nu_e$;

an F element being double convex having an axial thickness $t_f$, radius of curvatures of $R_{31}$ and $R_{32}$, said F element being in contact with said E element, an index of refraction $N_f$ and an Abbe number $\nu_f$;

a G element being a negative meniscus having an axial thickness $t_g$, radius of curvatures of $R_{33}$ and $R_{34}$, said G element being spaced from said F element by an axial spacing $S_f$, an index of refraction $N_g$ and an Abbe number $\nu_g$;

an H element being double convex having an axial thickness of $S_h$, radius of curvatures $R_{35}$ and $R_{36}$, said H element being in contact with said G element, an index of refraction $N_h$, and an Abbe number $\nu_h$;

wherein said thicknesses, spacings, radii, indicies of refraction, and Abbe numbers are substantially:

| | |
|---|---|
| $R_{21}=0.68$ fl. | $t_a=0.1$ fl. |
| $R_{22}=1.13$ fl. | $t_b=0.09$ fl. |
| $R_{23}=-1.13$ fl. | $t_c=0.08$ fl. |
| $R_{24}=3.11$ fl. | $t_d=0.09$ fl. |
| $R_{25}=0.47$ fl. | $t_e=0.09$ fl. |
| $R_{26}=2.55$ fl. | $t_f=0.1$ fl. |
| $R_{27}=-2.55$ fl. | $t_g=0.09$ fl. |
| $R_{28}=-0.28$ fl. | $t_h=0.1$ fl. |
| $R_{29}=-0.30$ fl. | |
| $R_{30}=-0.51$ fl. | |
| $R_{31}=0.51$ fl. | |
| $R_{32}=0.52$ fl. | $S_b=0.05$ fl. |
| $R_{33}=0.90$ fl. | $S_d=0.1$ fl. |
| $R_{34}=-0.46$ fl. | $S_f=0.001$ fl. |
| $R_{35}=0.46$ fl. | |
| $R_{36}=0.84$ fl. | |
| | |
| $N_a=1.59$ | $\nu_a=60$ |
| $N_b=1.61$ | $\nu_b=44$ |
| $N_c=1.59$ | $\nu_c=60$ |
| $N_d=1.61$ | $\nu_d=44$ |
| $N_e=1.61$ | $\nu_e=44$ |
| $N_f=1.59$ | $\nu_f=60$ |
| $N_g=1.61$ | $\nu_g=44$ |
| $N_h=1.59$ | $\nu_h=60$ | where fl. is the focal length of the lens system.

9. An eight element lens system, comprising in combination:

an A element being double convex having an axial thickness $t_a$, radius of curvatures of $R_{21}$ and $R_{22}$, an index of refraction $N_a$, and an Abbe number $\nu_a$;

a B element being a negative meniscus having an axial thickness $t_b$, radius of curvatures of $R_{23}$ and $R_{24}$, said B element being in contact with said A element, an index of refraction $N_b$ and an Abbe number $\nu_b$;

a C element being double convex having an axial thickness of $t_c$, radius of curvatures of $R_{25}$ and $R_{26}$, said C element being spaced from said B element by an axial spacing $S_b$, an index of refraction $N_c$ and an Abbe number $\nu_c$;

a D element being double concave having an axial thickness of $t_d$, radius of curvatures of $R_{27}$ and $R_{28}$, said D element being in contact with said C element, an index of refraction $N_d$, and an Abbe number $\nu_d$;

an E element being double concave having an axial thickness $t_e$, radius of curvatures of $R_{29}$ and $R_{30}$, said E element being spaced from said D element by an axial spacing $S_3$, an index of refraction $N_e$ and an Abbe number $\nu_e$;

an F element being double convex having an axial thciknesss $t_f$, radius of curvatures of $R_{31}$ and $R_{32}$, said F element being spaced from said E element by an axial spacing $S_e$, an index of refraction $N_f$ and an Abbe number $\nu_f$;

a G element being a negative meniscus having an axial thickness $t_g$, radius of curvatures of $R_{33}$ and $R_{34}$, said G element being spaced from said F element by an axial spacing $S_f$, an index of refraction $N_g$ and an Abbe number $\nu_g$;

an H element being double convex having an axial thickness of $t_h$, radius of curvatures of $R_{35}$ and $R_{36}$, said H element being in contact with said G element, an index of refraction $N_h$ and an Abbe number $\nu_h$;

wherein said thicknesses, spacings, radii, indicies of refraction and Abbe numbers are substantially:

$R_{21}=0.93$ fl.
$R_{22}=0.45$ fl.
$R_{23}=-0.45$ fl.
$R_{24}=0.70$ fl.
$R_{25}=0.52$ fl.
$R_{26}=0.64$ fl.
$R_{27}=-0.64$ fl.
$R_{28}=-0.35$ fl.
$R_{29}=-0.27$ fl.

$t_a=0.1$ fl.
$t_b=0.09$ fl.
$t_c=0.09$ fl.
$t_d=0.09$ fl.
$t_e=0.09$ fl.
$t_f=0.09$ fl.
$t_g=0.09$ fl.
$t_h=0.1$ fl.

$R_{30}=-0.52$ fl.
$R_{31}=0.52$ fl.
$R_{32}=0.39$ fl.
$R_{33}=0.75$ fl.
$R_{34}=-0.29$ fl.
$R_{35}$ $0.29$ fl.
$R_{36}=1.94$ fl.

$N_a=1.487$
$N_b=1.517$
$N_c=1.487$
$N_d=1.517$
$N_e=1.517$
$N_f=1.487$
$N_g=1.517$
$N_h=1.487$ $S_b=0.001$ fl.
$S_d=0.15$ fl.
$S_e=0.01$ fl.
$S_f=0.001$ fl.

$\nu_a=84.5$
$\nu_b=64.2$
$\nu_c=84.5$
$\nu_d=64.2$
$\nu_e=64.2$
$\nu_f=84.5$
$\nu_g=64.2$
$\nu_h=84.5$ where Fl. is the focal length of the lens system.

* * * * *